Figure 1:
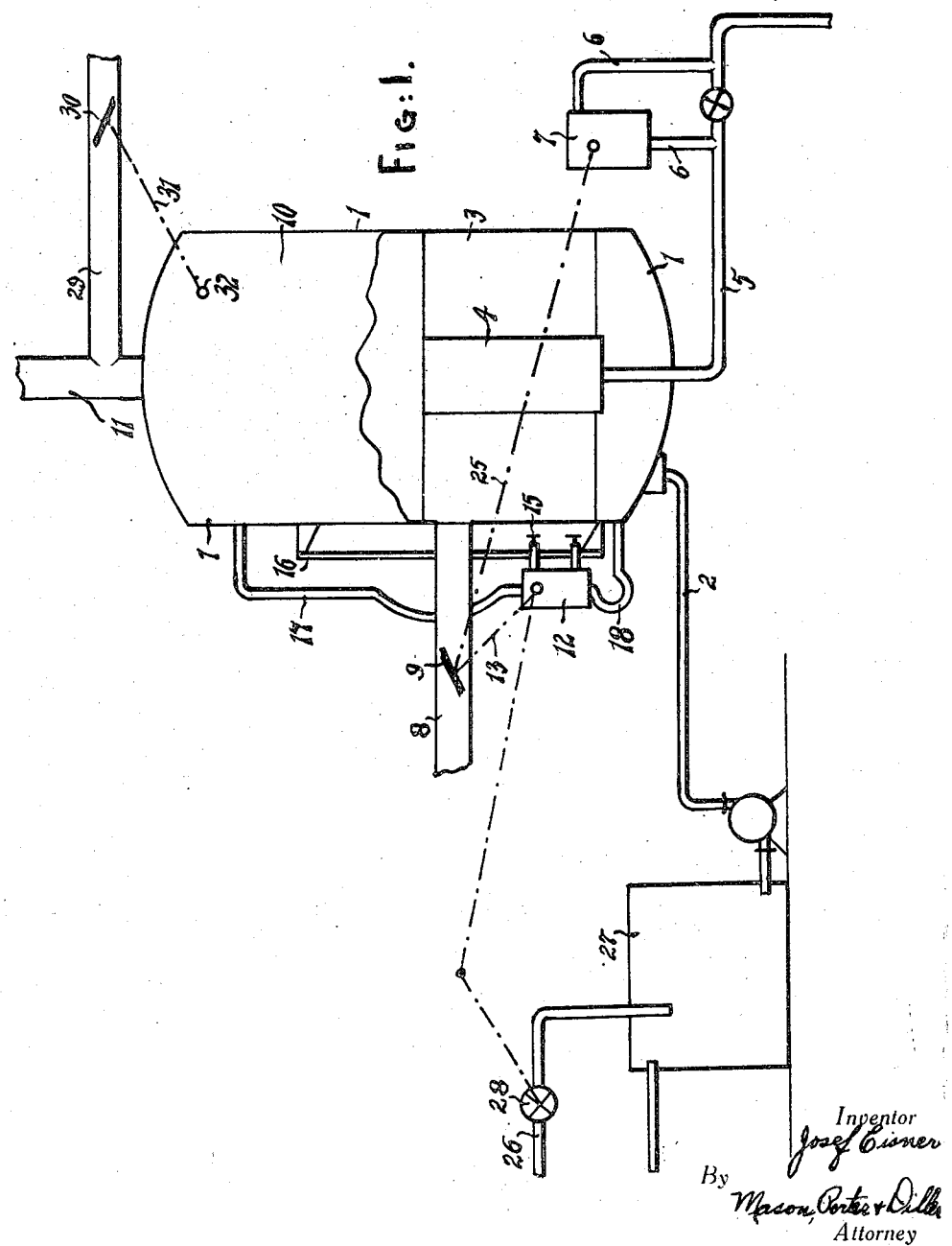

June 7, 1949.　　　　J. EISNER　　　　2,472,409
EVAPORATOR

Filed Aug. 18, 1944　　　　3 Sheets-Sheet 1

Inventor
Josef Eisner
By
Mason, Porter & Diller
Attorney

June 7, 1949.　　　　J. EISNER　　　　2,472,409
EVAPORATOR
Filed Aug. 18, 1944　　　　　　　　　　3 Sheets-Sheet 3
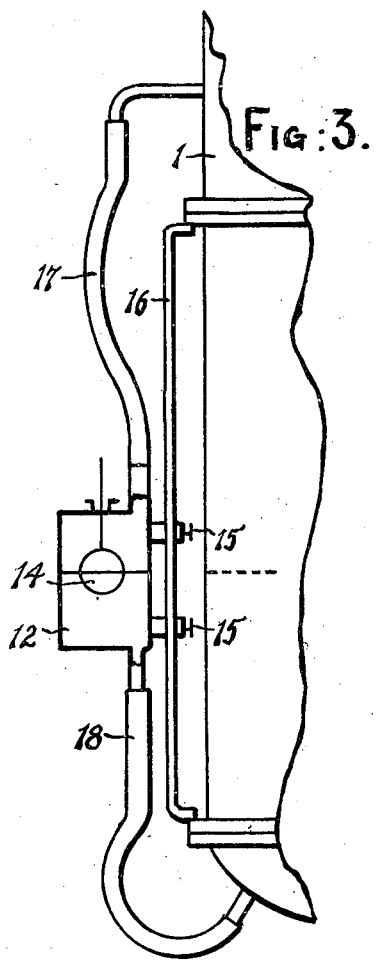
Inventor
Josef Eisner
By
Mason, Porter & Diller
Attorney Patented June 7, 1949

2,472,409

UNITED STATES PATENT OFFICE 2,472,409

EVAPORATOR

Josef Eisner, Allestree, Derby, England, assignor to George Fletcher and Company Limited, Derby, England, a British company Application August 18, 1944, Serial No. 550,092
In Great Britain May 2, 1944

10 Claims. (Cl. 257—2)

The present invention relates to improvements in evaporators such as are used in industry for the continuous concentration of liquors such as solutions or suspensions and wherein a relatively weak liquor is continuously fed in and a more concentrated liquor is continuously discharged therefrom.

The prime object of the invention is to provide an evaporator of the above type which will automatically discharge a concentrate of reasonably constant density with a varying rate of liquor input.

A further object of the invention is to enable the said density to be maintained reasonably constant when varying quantities of vapour are bled from the evaporator for use in associated processes.

According to the present invention an evaporator comprises an evaporator vessel having the characteristic of the sealed down-take type, means to deliver heat to said vessel and means to control the rate of heat supplied according to the fluctuations in the liquor level in said evaporator vessel.

The expression "evaporator vessel having the characteristic of the sealed down-take type" is used in this specification to mean an evaporator vessel in which the liquor level in the vessel fluctuates as a function of the rate of liquor feed into and the rate of evaporation in the vessel in contrast to other types in which the fluctuation of the liquor level is also dependent upon the rate of liquor discharge.

An evaporator vessel having the characteristic of the sealed down-take type is selected because the fluctuations of the liquor level therein afford an indication of the heat requirements of the evaporator and can thus be used to control the heat input whereas in other types of evaporator such fluctuations do not necessarily reflect the heat requirements.

According to a further feature of the invention an evaporator comprises a number of evaporator vessels connected in multiple effect, at least one of said vessels, to which the weak liquor is fed, having the characteristic of the sealed down-take type, means to deliver heat to the evaporator vessels, and means to control the amount of heat delivered to said evaporator vessels per unit time according to the liquor level in the said evaporator vessel having the characteristic of the sealed down-take type.

The term "multiple effect evaporator" is employed in this specification to signify an exaporator in which the liquor is passed from one vessel to another and in which vapour produced in one vessel is used for heating in another.

The invention includes a method of operating an evaporator for the continuous concentration of liquors consisting in continuously feeding liquor into the evaporator without imposing a liquor input flow control, feeding heat to the evaporator, allowing the concentrate to discharge without flow control so as to render the liquor level in the evaporator dependent upon the rates of heat and liquor input, and making use of the fluctuations in the liquor level to control the heat input.

The invention further includes a method of operating a multiple effect evaporator for the continuous concentration of liquors consisting in continuously feeding liquor into one evaporator vessel without imposing a liquor input flow control, passing said liquor from one vessel to another, feeding heat to said one evaporator vessel, allowing liquor to discharge from said one vessel without flow control so as to render the liquor level in said vessel dependent on the rates of heat and liquor input and making use of the fluctuations of the liquor level in said vessel to control the heat input to said vessel.

With the control arrangement of this invention, liquor is able to flow freely to and away from the evaporator, or in the case of a multiple effect evaporator, at least to the first and from the last effect, in contradistinction to control devices hitherto in use in which the liquor flow to or from the evaporator has been modified to obtain a control of the evaporation or of the degree of concentration of the liquor.

The control arrangement may be supplemented by control means sensitive to variations in the density of the liquor in, or leaving the evaporator, so as to substantially achieve a predetermined liquor density.

Further control may be applied to the support and flow of the heat so as to maintain or limit the pressures or temperatures of the vapour and liquor in the evaporator at substantially predetermined values, especially in cases when an excessively high temperature would damage the substance in the liquor subjected to concentration or in cases when vapour from the evaporator is required to be bled away for use in associated processes at predetermined pressures or temperatures.

Again, in the case of a multiple effect evaporator controls may be used to operate the gradual cutting out of or bringing into operation, partly or wholly, of one or more effects of the evaporator, thus adjusting the evaporating capacity of the evaporator to suit a required rate of evaporation.

Where a control is sensitive to pressure of vapour in an evaporator vessel, it is obvious that a device sensitive to temperature may be substituted therefor and vice versa, as the temperature of the vapour is a function of its pressure.

Figure 2:
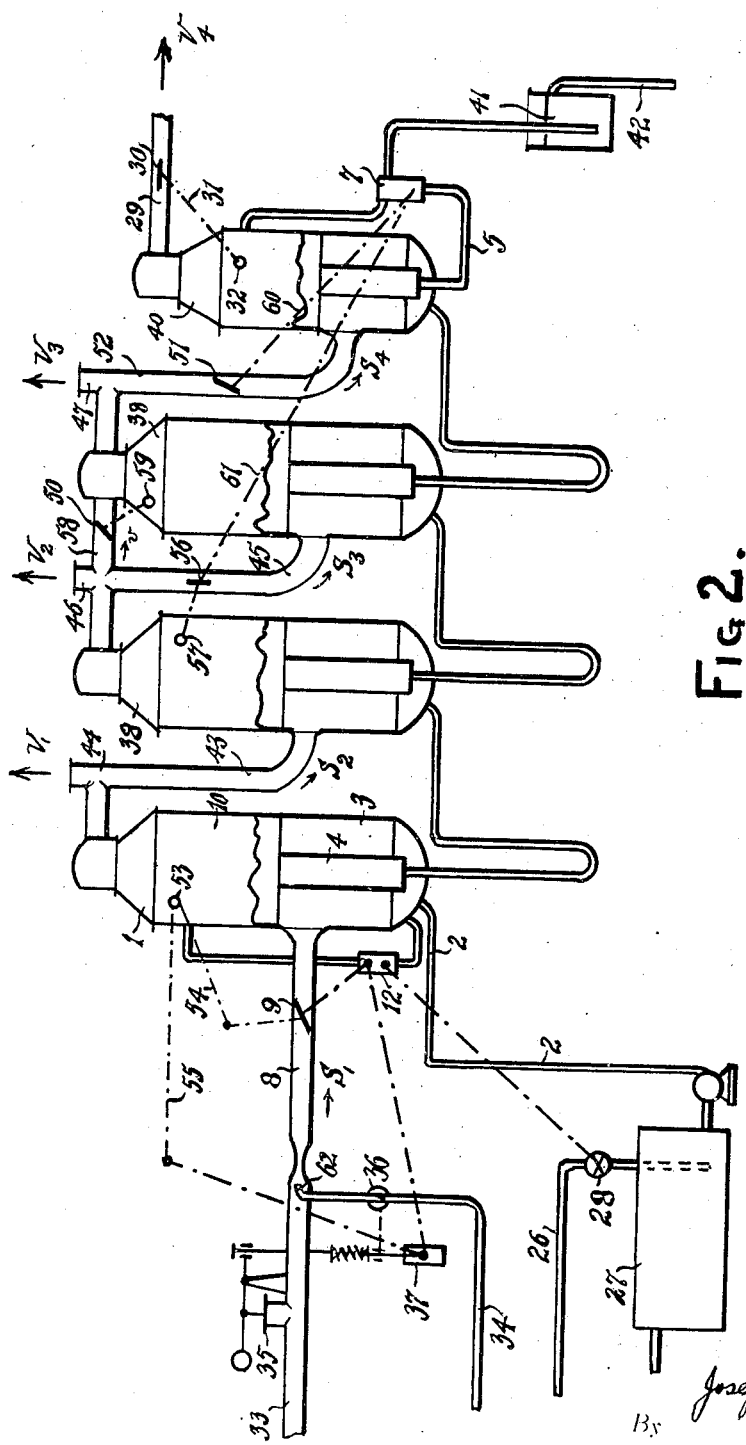

Arrangements according to this invention are described with reference to the accompanying drawings, in which:

Fig. 1 is a diagrammatic elevation of a simple form of application of the invention, while Fig. 2 is a diagrammatic elevation showing an application of the invention to a multiple effect evaporator, Fig. 3 is a diagrammatic detail view on an enlarged scale of a float control as may be used in conjunction with this invention.

Referring to Fig. 1, liquor to be concentrated, that is to say to have its density increased by evaporation, is passed continuously to the evaporator vessel 1 by a supply tube 2, and then passes through the bank of vertical tubes of the calandria 3, leaving the evaporator vessel, which in this case is of the "sealed downtake" type, by the downtake 4 and the outlet pipe 5 from which a by-pass 6 leads through a densimeter 7.

Heat is supplied in the form of steam through the pipe 8 and is governed by a valve 9.

Assuming that the vapour space 10 of the vessel is open to atmosphere through the pipe 11, with consequently the pressure in space 10 remaining constant, and also assuming constant rates of liquor feed and heat supply, the liquor level in the tubes of the calandria 3 will assume a definite position, in view of the characteristics of the sealed downtake type evaporator, and the liquor leaving the vessel will reach a definite density.

Should, however, while the rate of heat supply is maintained at the former value, the rate of liquor feed be progressively increased, then the previous state of equilibrium is disturbed, the density will fall, whilst the liquor level will rise. This displacement of the level, by this invention, operates a control element such as a float in a float chamber 12 suitably connected with the vessel 1, which float is connected by suitable linkage 13 with the steam control valve 9, either directly or indirectly through relay or servo-motor means, so that the rise of level will cause valve 9 to open to a greater extent, allowing more heat to pass to the calandria 3. Following this, the rate of evaporation will increase, the rise in liquor level will tend to be arrested, the density of the concentrated liquor will tend to rise, and if the rate of the liquor feed is stabilised at a new higher value, then a new state of equilibrium will be attained, although the density of the concentrated liquor may differ from its previous value.

It will be seen that equilibrium will be attained in a similar fashion should the rate of liquor feed be reduced.

By suitable adjustment of linkage 13 between control element 12 and the valve 9, and by a suitable selection of position for this control element 12, it may be possible to obtain a satisfactorily constant value of density within certain limits of variation in the liquor feed.

In order to be able to set the control element 12 to the required position according to the condition of operation, the control means 12 may be mounted to be displaceable between wide limits. This may be achieved in many ways, as for instance in the arrangement shown in Fig. 3, in which a float 14 in a float chamber 12 and connected by suitable linkage with the steam valve 9 has this chamber 12 mounted to be adjustable by means of clamps 15 on a vertical guide 16 carried by the wall of the effect 1 and connected to the spaces above and below the evaporator tubes by means of flexible connections 17, 18, respectively. It will be obvious that it will be desirable that the linkage interconnecting the float 14 and the valve 9 will be unaffected in operation by any positioning of the float chamber 12 along the guide support 16.

In certain cases, it will be desirable to provide a governing control operated by variations in the density of the concentrated liquor; for instance, by connecting a displaceable element of the densimeter 7 with the steam valve 9, through linkage 25, which control is independent of the control 12, and in this manner it will be possible to maintain the concentrated liquor at a substantially constant value even with the liquor feed and the vapour pressure varying over considerable ranges.

As is known, evaporators often operate where vapour is taken from the vapour space for use in associated processes or like purposes, and under such conditions further considerations will apply.

Assuming now that vapour from the vapour space 10, instead of passing freely to atmosphere, is wholly or partly consumed by associated processes connected to the pipe 11, it is obvious that more vapour cannot be drawn off for the associated processes than becomes available from the vapour space 10 whilst maintaining a desired density of concentrated liquor, unless extra quantities of water are led to the liquor space of the evaporator or added to the liquor in quantity corresponding to the excess demand for process vapour. In Fig. 1 such additional water is shown as led from supply pipe 26 to the supply tank 27 for the liquor from which the liquor is pumped through pipe 2 to the evaporator. The valve 28 governing the addition of water, may be operated automatically, for instance by a float in the supply tank 27, but preferably from the control 12 so that the addition of water becomes effective when the liquor level in the evaporator falls below a predetermined level.

Should the demand for process vapour, however, be less than the quantity evaporated per unit time in order to maintain the desired density, it is obvious that the excess must be released to atmosphere as by pipe 29. This vapour passage to atmosphere may be governed by valve 30 and this valve controlled either in the manner of a relief valve, or by linkage 31 from the displaceable element of a thermostat 32.

It will be seen that under the above described conditions, the associated processes can normally absorb substantially the whole amount of the vapour resulting from the evaporation of the liquor, and a single effect evaporator will be satisfactory as long as this is the case. In cases, however, where the mass of vapour required for associated processes is less than the mass of vapour necessarily resulting from the concentration of the liquor, it will be desirable to use a multiple effect evaporator, and thus to achieve a greater economy of operation.

In the arrangement of Fig. 2, showing the application of the invention to a quadruple effect evaporator, by way of example, $V_1$, $V_2$, $V_3$ may represent the quantities of vapour bled away for associated processes and $V_4$ the quantity of vapour leaving the last effect to either atmosphere or a condenser, which latter vapour may be regarded as lost. $S_1$, $S_2$, $S_3$ and $S_4$ may represent the quantities of steam or vapour entering the calandrias of the effects. $v$ represents any quantity of vapour which may be by-passed from one effect to another. Let E represent the total quantity of water to be evaporated per unit time under normal stable conditions of operation. It is permissible to assume that one pound of steam or vapour introduced to the calandria of any effect will evaporate one pound of water from the liquor in this effect.

Assuming now that no vapour is required for the associated processes, then $V_1$, $V_2$ and $V_3$ will each equal nought, $S_1 = V_4$ and under normal conditions $4V_4 = E$ and $4S_1 = E$.

Under these normal conditions $v$ also equals nought, the valve 50 will be closed and the controls 12 and 7 will have adjusted the valves 9 and 51 so that the correct amount $S_1$ is admitted to the evaporator and the desired density of the concentrated liquor obtained. The function of the controls will be similar to that described with reference to Fig. 1.

Should now the normal conditions no longer apply and more liquor be fed to the evaporator, more than the quantity of water E will have to be evaporated. Owing to the increased feed, control 12 will open valve 9 to a greater extent and thus increase the evaporation, as is obviously required. Should the new quantity of steam $S_1$ be increased by precisely the amount necessary, the liquor leaving the evaporator will have the required density. Should, however, the new setting of valve 9 not correspond and admit too little steam, then the liquor will, after a time lag, reach the densimeter 7 with a lower density, and the desimeter 7 will throttle the passage 52 less than before by opening valve 51 more, thus adjusting the evaporation taking place in the fourth effect and indirectly also in the previous effects, and gradually returning the liquor density to the desired value. The same applies conversely in the case of a reduced liquor feed.

For a correct operation of the system, a further control may be required which will limit the vapour pressure in the first effect and this may be achieved by a thermostat 53 superimposing a control on the steam valve 9 through linkage 54.

Considering now the case where process vapour is required, that is to say $V_1$, $V_2$, $V_3$, will each or all together differ from nought, then the conditions of equilibrium for normal working conditions may be expressed by the equations:

$$S_1 = V_1 + V_2 + V_3 + V_4$$

and $$E = S_1 + S_2 + S_3 + S_4 = V_1 + 2V_2 + 3V_3 + 4V_4$$

It will be seen that in this case the most economical working conditions prevail when $V_4 = 0$, that is to say no vapour is lost to the condenser, and if and when the demand for process vapour is such that this condition can be at all fulfilled, the passage 52 will be completely closed and therefore the fourth effect will be out of operation and no vapour will pass to the condenser, excepting flash due to the fact that the liquor arrives in effect 40 at a temperature higher than that corresponding to the pressure in this fourth effect. Effect 40 will then be cut out of operation and will only be brought back into operation when, owing to altered conditions, the most economical state can no longer be maintained with the three effects working alone. In cases like the one above indicated, it will be desirable not only to maintain the liquor density at a desired value but also the temperatures or pressures of the vapour bled away for the associated processes which facilitates the efficient operation of these processes. For this purpose various other controls may be used.

The choice, number and disposition of these controls will differ with differing requirements. In the arrangement shown, heat is supplied in the form of steam at two differing pressures, namely exhaust from pipe 33 and live steam from pipe 34. The quantity of exhaust steam is on the one hand limited by the load on the steam engine supplying the exhaust steam, and on the other hand, this quantity normally passing to the evaporator cannot be reduced except by relief to atmosphere through valve 35. The live steam supply is considered as indefinitely variable and will be made use of only when the heat requirements of the evaporator exceed the quantity of exhaust steam available.

The admission of live steam is governed by the valve 36 which is operated by the servo-motor 37 which is controlled by the means 12. This servo-motor, by this invention, is so connected with the valves 36 and 35 that it will open the valve 35 only after having completely shut valve 36. As long as valve 36 is open to any degree, valve 35 remains shut, except when for some reason the pressure in pipe 33 should exceed the pressure for which the valve 35 is set, when this valve, operating as an ordinary relief valve, will open independently of the action of the servo-motor.

With this arrangement, valve 9 in pipe 8 will always be completely open, and therefore does not require any automatic control.

Liquor is admitted to the evaporator through pipe 2, it will boil up through the tubes of the calandria 3 and leave the first effect 1 by a sealed downtake 4 and pass to the second effect 38. It passes through this effect 38 and third effect 39 and fourth effect 40 in the same manner.

The concentrated liquor leaves the fourth effect 40 through pipe 5 and passes away through the desimeter 7 to a seal 41 and the final outlet 42.

It will be noticed that no automatic controls are imposed upon the liquor flow through the system.

The steam in quantity $S_1$ entering the calandria 3 of the first effect will be condensed, giving up its latent heat to the liquor, from which an equal quantity of vapour will be produced, which vapour passes through the space 10 and then to the pipe connection 43 which has a branch 44 for process vapour supply.

The quantity of steam $S_2$, where $V_1 + S_2 = S_1$, will pass to the second effect producing vapour in equal quantity which will pass on to pipe connection 45 having a branch 46 for process vapour supply, where $V_2 + S_3 = S_2$, this applying, of course, only as long as $v = 0$. Similarly $S_3$ produces in the third effect 39 a quantity of vapour passing to pipe connection 52 having a branch 47 for process vapour supply, where $V_3 + S_4 = S_3$. Again $S_4$ will produce a quantity of vapour in the fourth effect 40 which will (disregarding flash) $= V_4$ which is lost to the condenser through pipe 29, the passage of which is governed by valve 30.

In addition to the controls already mentioned, the following are used. The aforementioned thermostat 53 will in this case be connected by linkage 55 to the servo-motor 37 in which case linkage 54 is omitted, thus the main control of the flow of heat to the evaporator is achieved by the means 36, 35, 37, 12 and 53, with their respective linkages.

Further control of the heat flow through the system is governed by a valve 56 controlled by a thermostat 57, a valve 59 in a by-pass connection 58, and controlled by a thermostat 59, further the valve 51 already mentioned and controlled by densimeter 7 through linkage 60, and finally through the valve 30 controlled by the thermostat 32 through linkage 31.

This latter thermostat 32 is set so that the valve 30 will throttle the pipe connection 29 so as to pass a quantity of vapour corresponding to a predetermined temperature desirable in the last effect, which temperature will be substantially equal to that of the concentrated liquor leaving the apparatus. The throttle valve 30 will be effective in maintaining this desired temperature, even in the case when valve 51 is shut and therefore $S_4=0$, as there will always be present the small quantity of vapour resulting from flash.

Assuming now that a definite rate of liquor feed of given density to the evaporator is maintained, the quantity E of total evaporation is a determined one in order to obtain the desired final density of the concentrated liquor. Assuming, further, that the requirements for process steam are such that the conditions expressed by $S_1=V_1+V_2+V_3$ and $E=V_1+2V_2+3V_3$ prevail, then valve 51 will be shut as previously explained and the system is working under the most economical conditions with effect four out of operation, that is to say the system is working virtually as a triple effect.

For the purpose of maintaining the pressures and temperatures of vapour supplied to the associated processes at substantially constant values, the thermostats 53, 57, and 59 are set as follows: 53 will act on servomotor 37 so as to reduce the steam supply if and when the temperature in the vapour space 10 of the first effect rises appreciably above a predetermined value and vice versa. This operation will be independent of the control of the servo-motor 37 by the liquor level control 12.

Thermostat 57 is set to leave the valve 56 fully open as long as the temperature in the second effect 38 is at or rises above a predetermined value, and will close it gradually when this temperature tends to drop below this value. Thermostat 59 is set to leave the valve 59 completely shut as long as the temperature in the third effect 39 remains at or exceeds a predetermined value, but gradually to open this valve 59 when this temperature tends to drop below this value.

Regarding now as normal the state in which:

(1) The rate of liquor feed at a given density is maintained so that the required total evaporation is E.

(2) The density of the concentrated liquor is substantially at its desired value.

(3) That the demand for process vapour is such that the best economical conditions prevail with valve 51 shut, and (4) That all temperatures in the vapour spaces of the effects are substantially at their predetermined normal values; then, we shall consider the operation and influence of the various controls if and when either the rate of liquor feed is altering or the rate of vapour bleeding is altering.

Should the rate of liquor feed increase, which will require an excess evaporation $e$ above $E$, while the rate of bleeding of process vapour remains unchanged, then the following actions will take place.

The liquor level in the first effect will rise and cause more steam to be admitted to the system, the temperatures right through the system will increase and, after a time lag, thinner liquor will reach the densimeter 7. This will therefore open valve 51 and bring into operation the fourth effect to the extent required to restore the density to its predetermined value. The opening of valve 51 will tend to check the tendency of rising temperatures, the thermostat 53 will in the meantime have prevented an excessive temperature in the first effect and a new equilibrium will be reached when $E+e=V_1+2V_2+3V_3+4V_4$ with the quantity of vapour $V_4$ lost past valve 30 equal $\frac{1}{4}e$.

The steam supply will have reached stability with $S_1$ now equalling its previous value plus $V_4$ which again is equal to $\frac{1}{4}e$, therefore the new value of S will be $S_1+\frac{1}{4}e$.

Considering now the case with the rate of liquor feed being reduced below the previously determined normal, then the liquor level in vessel 1 will tend to drop, the heat supply will be reduced by the control 12, the fourth effect, of course, will be out of operation and the temperatures right through the system will fall and the drop of temperature in the second effect 38 will cause the thermostat 57 to gradually close valve 56 reducing the vapor supply to the third effect, virtually therefore partially shutting this down, thus reducing the evaporation as obviously required.

In consequence of the closing of valve 56 the temperature in the third effect will now tend to drop considerably, which is not permissible in regard to the user of process steam $V_3$, and this undesirable state is avoided in that the valve 59 will be gradually opened owing to this drop in temperature acting on the thermostat 59. The valve 59 will now let by-pass a quantity of vapour $v$ directly from the second to the third effect, thus tending to restore the original temperature and supplementing the reduction of evaporation in the third effect.

In this way the density of the concentrated liquor will be substantially maintained correct, but, as the densimeter 7 had up to now no influence, the density might rise above the normal value. It is therefore possible to achieve a more definite density control by controlling valve 56 not only by the thermostat 57 but also by the densimeter 7 through linkage 61. The densimeter will act on valve 51 in the case of falling density and on the valve 56 in the case of rising density.

Considering now the other case, that more vapour is required to be bled away than normally, while the rate of liquir feed remains normal and therefore the amount of water to be evaporated remains equal E, then the temperatures throughout the system will tend to drop. The dropping temperatures will cause the valve 56 to close and the valve 59 to open, consequently evaporation in the third effect 39 will be reduced and too high a concentration of the liquor prevented. At the same time the thermostat 53 will act upon the servomotor 37 causing the admission of more steam, as obviously required when more vapour is bled away. Should the action of the valves 59 and 56 not have sufficiently reduced the evaporation, then, with a time lag, too concentrated a liquor might reach the densimeter 7 and this will cause valve 56 to close more and further to reduce the evaporation, thus bringing the liquor density back to its normal value.

When less vapour is required to be bled away than normally, then the temperatures throughout the system will tend to rise, and the thermostat 53 will cause a reduction in the steam supply by closing valve 36, but valve 56 will remain fully open and vave 50 shut. After a short time, however, thinner liquor will reach the densimeter 7, and this will cause valve 51 to open, thus the fourth effect will be brought into operation and additional evaporation achieved which will restore the liquor density to substantially its normal value.

In practical operation all the variable conditions may change simultaneously, but this does not alter materially the manner of operation of the various automatic controls as described, and they will always act so as to re-establish the equilibrium.

In certain cases it may be desirable to give an indication or warning when an uneconomical state of working occurs in the system, so that the users of process vapour may change over for instance from using most of their requirement of vapour from the first effect to using more from the second effect, thus helping towards more evaporation and the reduction or elimination of loss of heat to the condenser connected to pipe 29. This indicator or warning may be operated from the displacement of the valve 51 or part connected with it. Similarly a warning or indicating means may be operated from valve 50 when this is in the open position to allow users of process vapour to take a greater proportion of vapour from the first effect and a lesser proportion from the second effect.

In many cases an evaporator will be supplied with exhaust steam, and live steam will be used only to the extent as the available quantity of exhaust steam is short of the requirements of the evaporator. If the deficiency in exhaust steam is relatively small, that is that only a small proportion of live steam is needed normally, there is little margin left for an efficient control of the steam consumption when less than normal evaporation is needed. A means to increase the margin of control in such cases and, or alternatively, to give the possibility of operating the evaporator at high loads with a calandria pressure higher than the maximum back-pressure permissible with the power engines supplying the exhaust steam, consists in a compressor 62 illustrated (Fig. 2) as a steam jet injector. With this arrangement the calandria pressure $p_2$ may be considerably higher than the back-pressure $p_1$ of the exhaust steam as long as it is necessary to admit some high pressure steam. It is obvious that $p_2$ has to be the higher the more work is required of the evaporator. While without the compressor the calandria pressure $p_2$ and therefore also the working capacity of the evaporator are limited by the highest back-pressure permissible for the engines, this is not the case when the jet or other compressor 62 is used, as at high evaporator loads much high pressure steam has to be added and this is able to raise $p_2$ above $p_1$ so that the back-pressure will never have to reach the maximum for any normal load of the evaporator. This may give the possibility of using the engines for a higher power output than hitherto and it will at the same time increase the range of effective control of the evaporator. Thus the capacity of the evaporator and, or alternatively, of the steam engines may be increased.

Another limitation of efficient control in cases as just described arises when (with or without a compressor such as 62) the required evaporator load drops to such an extent that no live steam has to be added and that even the admission of exhaust steam to the calandria 3 will have to be reduced. The usual procedure in such a case is to throttle the steam valve 9 (after the live steam valve 36 has been shut). This will lead to an increase of the back-pressure, which causes an increase of the quantity of live steam required for the engines for the given load, and finally the safety valve for exhaust steam will blow off the surplus of exhaust steam. This loss may be considerably reduced by an arrangement according to this invention in which the control of the live steam valve 36 is combined with a further control which comes into action when the steam requirements of the evaporator have dropped to such an extent that the live steam is completely shut off and when even the admission of exhaust steam to the calandria has to be reduced. With the arrangement as shown in Fig. 2 and already explained before this reduction is not achieved by throttling the steam valve 9 but by opening the relief valve 35 (or adequate substitute) to such an extent that the surplus steam may escape. In this manner an increase of the exhaust pressure, just when it is not needed, is avoided, and on the contrary the exhaust pressure will drop, consequently the engines will require less live steam for a given load, and thus considerable waste is avoided. The operation of valves 36 and 35 may be effected automatically by means of a servomotor 37 controlled by either the liquid level in the effect 1, or by the means responsive to vapour pressure or temperature in its vapour space or by both, or may also be influenced by a densimeter.

I declare that what I claim is:

1. An evaporator for the continuous concentration of liquors wherein a relatively weak liquor is continuously fed in and a more concentrated liquor is continuously discharged therefrom comprising in combination an evaporator vessel having the characteristic of the sealed down-take type, means to deliver heat to the vessel, means to control the amount of heat delivered per unit time according to fluctuations in liquor level in said evaporator vessel, caused by evaporation and discharge therefrom, and means to independently control the amount of heat delivered to the evaporator according to variations in temperature of the vapour in the evaporator vessel.

2. An evaporator for the continuous concentration of liquors wherein a relatively weak liquor is continuously fed in and a more concentrated liquor is continuously discharged therefrom including in combination a number of evaporator vessels connected in multiple effect, at least one of said vessels to which the weak liquor is fed having the characteristic of the sealed down-take type, means to deliver heat to the said vessels, means to control the amount of heat delivered to the evaporator vessels per unit time according to fluctuations in liquor level in said evaporator vessel above described, caused by evaporation and discharge therefrom, and means to control the heat delivered to the evaporator vessels according to variation in temperature of the vapour in the said vessel.

3. An evaporator for the continuous concentration of liquors wherein a relatively weak liquor is continuously fed in and a more concentrated liquor is continuously discharged therefrom including a number of evaporator vessels connected in multiple effect, at least one of said vessels, to which the weak liquor is fed, having the characteristic of the sealed down-take type, means to deliver heat to the evaporator vessels, means to control the amount of heat delivered per unit time according to changes in the liquor level in the said evaporator vessel having the characteristic of the sealed down-take type, and means to control the heat flow through the series of evaporator vessels according to variations in temperature of the vapour in said evaporator vessels.

4. An evaporator for the continuous concentration of liquors wherein a relatively weak liquor is continuously fed in and a more concentrated liquor is continuously discharged therefrom comprising in combination an evaporator vessel having the characteristic of the sealed down-take type, a supply of exhaust steam for heating said vessel, a supply of live steam for heating said vessel, means sensitive to fluctuations in liquor level in said vessel controlling said exhaust steam and live steam supplies, a relief valve on said exhaust steam supply, and means operating to open said relief valve subsequent to the cutting off of live steam by said control.

5. An evaporator for the continuous concentration of liquors wherein a relatively weak liquor is continuously fed in and a more concentrated liquor is continuously discharged therefrom including in combination an evaporator vessel having the characteristic of the sealed down-take type, an exhaust steam supply for heating said vessel, a live steam supply for heating said vessel, a relief valve on said exhaust steam supply, a stop valve on said live steam pipe, means sensitive to fluctuations in liquor level caused by evaporation and discharge from said vessel for operating said valves in sequence and actuating means sensitive to the temperature of the vapour in the evaporator for independently operating said valves in sequence.

6. An evaporator for the continuous concentration of liquors wherein a relatively weak liquor is continuously fed in and a more concentrated liquor is continuously discharged therefrom including a number of evaporator vessels connected in multiple effect, at least one of said vessels, to which the weak liquor is fed, having the characteristic of the sealed down-take type, means to deliver heat to the evaporator vessels, means to control the amount of heat delivered per unit time according to the liquor level in the said evaporator vessel having the characteristic of the sealed down-take type, and means to progressively restrict evaporation in the units of the evaporator from the last unit backwards.

7. An evaporator for the continuous concentration of liquors wherein a relatively weak liquor is continuously fed in and a more concentrated liquor is continuously discharged therefrom including a number of evaporator vessels connected in multiple effect, at least one of said vessels, to which the weak liquor is fed, having the characteristic of the sealed down-take type, means to deliver heat to the evaporator vessels, means to control the amount of heat delivered per unit time according to fluctuations in the liquor level in the said evaporator vessel having the characteristic of the sealed down-take type, means to add water to the liquor, and means to control the amount of water added according to the liquor level in the evaporator vessel.

8. An evaporator for the continuous concentration of liquors wherein a relatively weak liquor is continuously fed in and a more concentrated liquor is continuously discharged therefrom including a number of evaporator vessels connected in multiple effect, at least one of said vessels, to which the weak liquor is fed, having the characteristic of the sealed down-take type, means to deliver heat to the evaporator vessels, means to control the amount of heat delivered per unit time according to fluctuations in the liquor level in the said evaporator vessel having the characteristics of the sealed down-take type, means to draw off vapour from the evaporator vessels for associated processes, a by-pass valve between the vapour spaces of a pair of evaporator vessels, and means sensitive to the temperature of the vapour in one of the evaporator vessels operating said by-pass valve whenever the temperature falls below a predetermined minimum.

9. An evaporator for the continuous concentration of liquors wherein a relatively weak liquor is continuously fed in and more concentrated liquor is continuously discharged therefrom, comprising an evaporator vessel having the characteristic of the sealed down-take type, means to deliver heat to the vessel, means to control the rate of heat supply according to fluctuations of the liquor level in said evaporator vessel, means to draw off vapour from the evaporator for associated purposes, means to allow vapour from the evaporator to pass to atmosphere and means sensitive to the temperature of the vapour in the evaporator for controlling the passing of the vapour to atmosphere.

10. An evaporator for the continuous concentration of liquors wherein a relatively weak liquor is continuously fed in and a more concentrated liquor is continuously discharged therefrom, comprising a number of evaporator vessels connected in multiple effect, at least one of said vessels to which the weak liquor is fed having the characteristic of the sealed down-take type, means to deliver heat to the evaporator vessels, means to control the amount of heat delivered per unit of time according to the fluctuations in the liquor level in the said evaporator vessel having the characteristic of the sealed down-take type, means to draw off vapour from at least one evaporator vessel for associated purposes, means to add water to the liquor and means to control the amount of water added according to the liquor level in the said evaporator vessel having the characteristic of the sealed down-take type.

JOSEF EISNER.

REFERENCES CITED

The following references are of record in the file of this patent:

UNITED STATES PATENTS

| Number | Name | Date |
|---|---|---|
| 1,273,407 | Roesch | July 23, 1918 |
| 1,598,301 | Mugler | Aug. 31, 1926 |
| 2,135,512 | Holven | Nov. 8, 1938 |
| 2,240,952 | Hetzer | May 6, 1941 |